(12) United States Patent
Makimura (10) Patent No.: US 11,473,673 B2
(45) Date of Patent: Oct. 18, 2022

(54) SHIFT DEVICE (71) Applicant: KABUSHIKI KAISHA TOKAI-RIKA-DENKI-SEISAKUSHO, Aichi-ken (JP)

(72) Inventor: Munetoshi Makimura, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/320,332

(22) Filed: May 14, 2021

(65) Prior Publication Data
US 2021/0364082 A1 Nov. 25, 2021

(30) Foreign Application Priority Data
May 22, 2020 (JP) .............................. JP2020-090022

(51) Int. Cl.
*F16H 59/10* (2006.01)
*F16H 61/22* (2006.01)
*F16H 59/02* (2006.01)

(52) U.S. Cl.
CPC .......... *F16H 59/10* (2013.01); *F16H 59/0278* (2013.01); *F16H 61/22* (2013.01); *F16H 2059/0282* (2013.01)

(58) Field of Classification Search
CPC ...... F16H 59/10; F16H 59/0278; F16H 61/22; F16H 2059/0282
See application file for complete search history.

(56) References Cited

U.S. PATENT DOCUMENTS

| | | | |
|---|---|---|---|
| 10,940,829 B1 * | 3/2021 | Herhusky | B60Q 9/00 |
| 11,118,673 B1 * | 9/2021 | Vermeersch | F16H 61/22 |
| 2016/0245403 A1 | 8/2016 | Rake et al. | |
| 2019/0323600 A1 * | 10/2019 | Jiran | F16H 61/22 |
| 2020/0018392 A1 * | 1/2020 | Vermeersch | F16H 61/22 |
| 2020/0032896 A1 * | 1/2020 | Kageyama | F16H 59/0278 |
| 2020/0149625 A1 * | 5/2020 | Kameyama | F16H 63/42 |
| 2020/0149634 A1 * | 5/2020 | Kameyama | F16H 59/10 |
| 2020/0300356 A1 * | 9/2020 | Nonogawa | F16H 59/10 |
| 2020/0309252 A1 * | 10/2020 | Jiran | F16H 59/0204 |
| 2021/0364082 A1 * | 11/2021 | Makimura | F16H 59/10 |
| 2022/0003311 A1 * | 1/2022 | Watz | F16H 61/22 |
| 2022/0090675 A1 * | 3/2022 | Godfrey | F16H 61/22 |

FOREIGN PATENT DOCUMENTS

JP 2016-537232 A 12/2016

* cited by examiner

*Primary Examiner* — David M Fenstermacher
(74) *Attorney, Agent, or Firm* — Calderon Safran & Cole P.C.

(57) ABSTRACT

In a shift device, as a result of a rotor cam being rotated in a positive direction, and transmitting surfaces of the rotor cam pressing rotation surfaces of an urging cylinder, the urging cylinder is rotated in the positive direction, and a lever is moved rotationally towards a front side. Here, in a case in which a load towards the rear side is applied to the lever, the rotation surfaces are rotated in an opposite direction relative to the transmitting surfaces. As a result, the load towards the rear side being applied to the lever can be released.

10 Claims, 8 Drawing Sheets

SHIFT DEVICE

CROSS-REFERENCE TO RELATED APPLICATION

This application is based on and claims priority under 35 USC 119 from Japanese Patent Application No. 2020-90022 filed on May 22, 2020, the disclosure of which is incorporated by reference herein.

BACKGROUND

Technical Field

The present disclosure relates to a shift device in which a shift position is altered as a result of a shift body being moved.

Related Art

In a shift device described in Japanese Unexamined Patent Application Laid-Open (JP-A) No. 2016-537232, an operating element is rotated as a result of an adjustment ring transmitting rotation force to the operating element.

Here, in this shift device, it is preferable that, when the rotation of the operating element to which rotation force is transmitted by the adjustment ring is restricted, it be possible for a rotation restricting force applied to the operating element to be released.

SUMMARY

The present disclosure was conceived in view of the above-described circumstances, and it is an object thereof to provide a shift device in which it is possible for a movement restricting force applied to a shift body to be released.

A shift device of a first aspect of the present disclosure is provided with a shift body in which a shift position is altered as a result of the shift body being moved; a movement mechanism that transmits motive force to the shift body so that the shift body is moved; and a release mechanism that is provided on a motive force transmission path from the movement mechanism to the shift body, and that, in a case in which movement of the shift body to which motive force is to be transmitted by the movement mechanism is restricted, releases a movement restricting force applied to the shift body.

In the shift device of the first aspect of the present disclosure, the shift position is altered by the shift body being moved. The shift body is moved as a result of the movement mechanism transmitting motive force to the shift body.

Here, the release mechanism is provided on the motive force transmission path from the movement mechanism to the shift body, and in a case in which movement of the shift body to which motive force is to be transmitted by the movement mechanism is restricted, releases the movement restricting force applied to the shift body. Because of this, it is possible to release the movement restricting force being applied to the shift body.

A shift device of a second aspect of the present disclosure is characterized in that, in the shift device of the first aspect of the present disclosure, there is further provided an urging mechanism that urges the shift body towards a shift position side, and urging of the shift body by the urging mechanism is restricted in a case in which the movement mechanism transmits motive force to the shift body.

In the shift device of the second aspect of the present disclosure, the urging mechanism urges the shift body towards the shift position side.

Here, in a case in which the movement mechanism transmits motive force to the shift body, urging of the shift body by the urging mechanism is restricted. Because of this, it is possible to inhibit the urging mechanism from obstructing movement of the shift body.

A shift device of a third aspect of the present disclosure is characterized in that, in the shift device of the second aspect of the present disclosure, the release mechanism restricts urging of the shift body by the urging mechanism in a case in which the movement mechanism transmits motive force to the shift body.

In the shift device of the third aspect of the present disclosure, the release mechanism restricts urging of the shift body by the urging mechanism in a case in which the movement mechanism transmits motive force to the shift body. Because of this, the structure can be simplified.

A shift device of a fourth aspect of the present disclosure is characterized in that, in the shift device of any one of the first aspect through the third aspect of the present disclosure, after movement of the shift body to which the movement mechanism is transmitting motive force has been restricted, the movement mechanism is restored to a state the movement mechanism was in prior to transmitting motive force to the shift body.

In the shift device of the fourth aspect of the present disclosure, after movement of the shift body to which the movement mechanism is transmitting motive force has been restricted, the movement mechanism is restored to a state the movement mechanism was in prior to transmitting motive force to the shift body. Because of this, it is possible to inhibit the movement mechanism from restricting movement of the shift body.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
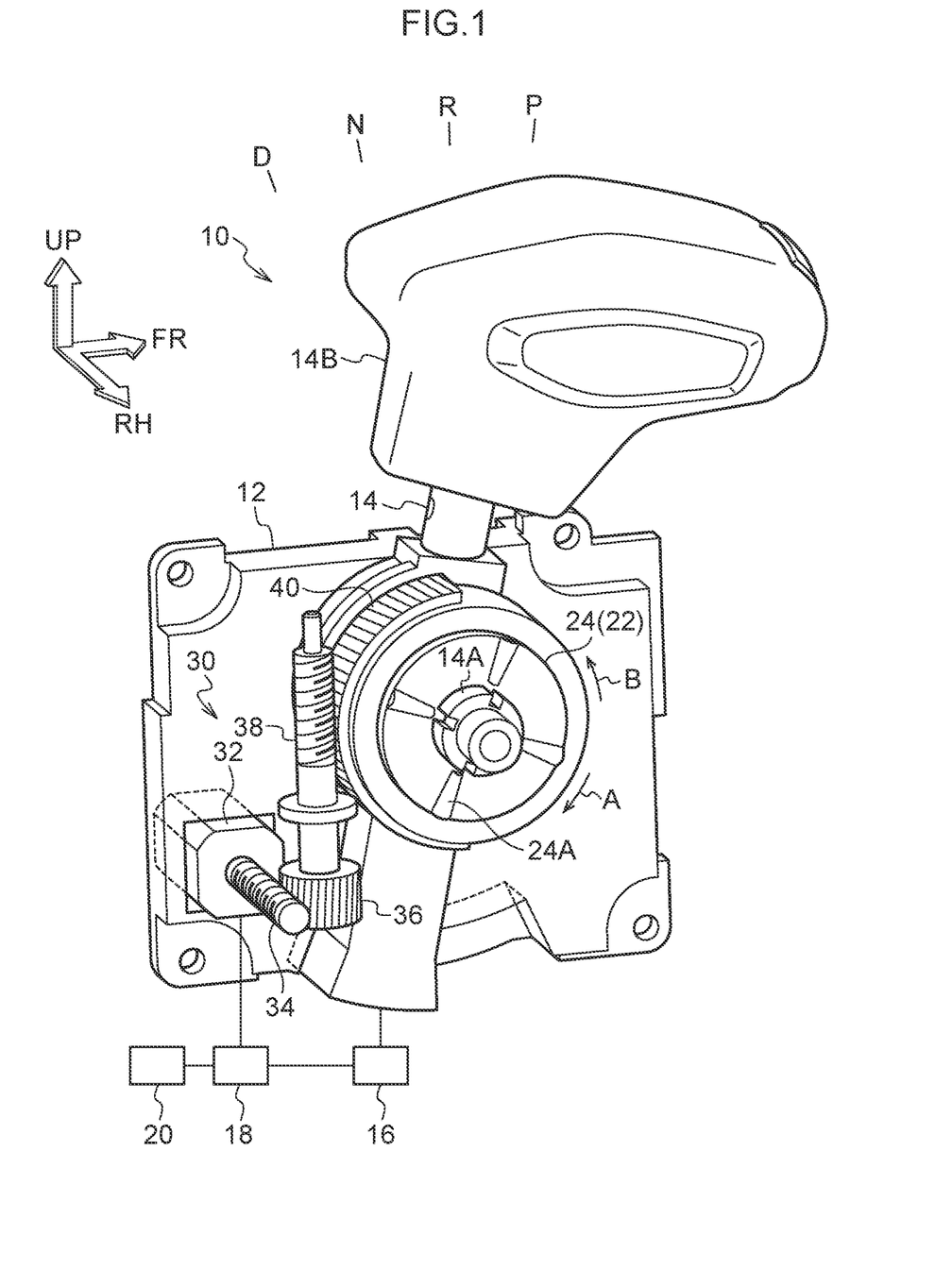
FIG. 1 is a perspective view as seen from a right-side diagonally rearward direction showing a shift device according to a first exemplary embodiment of the present disclosure.
Figure 3:
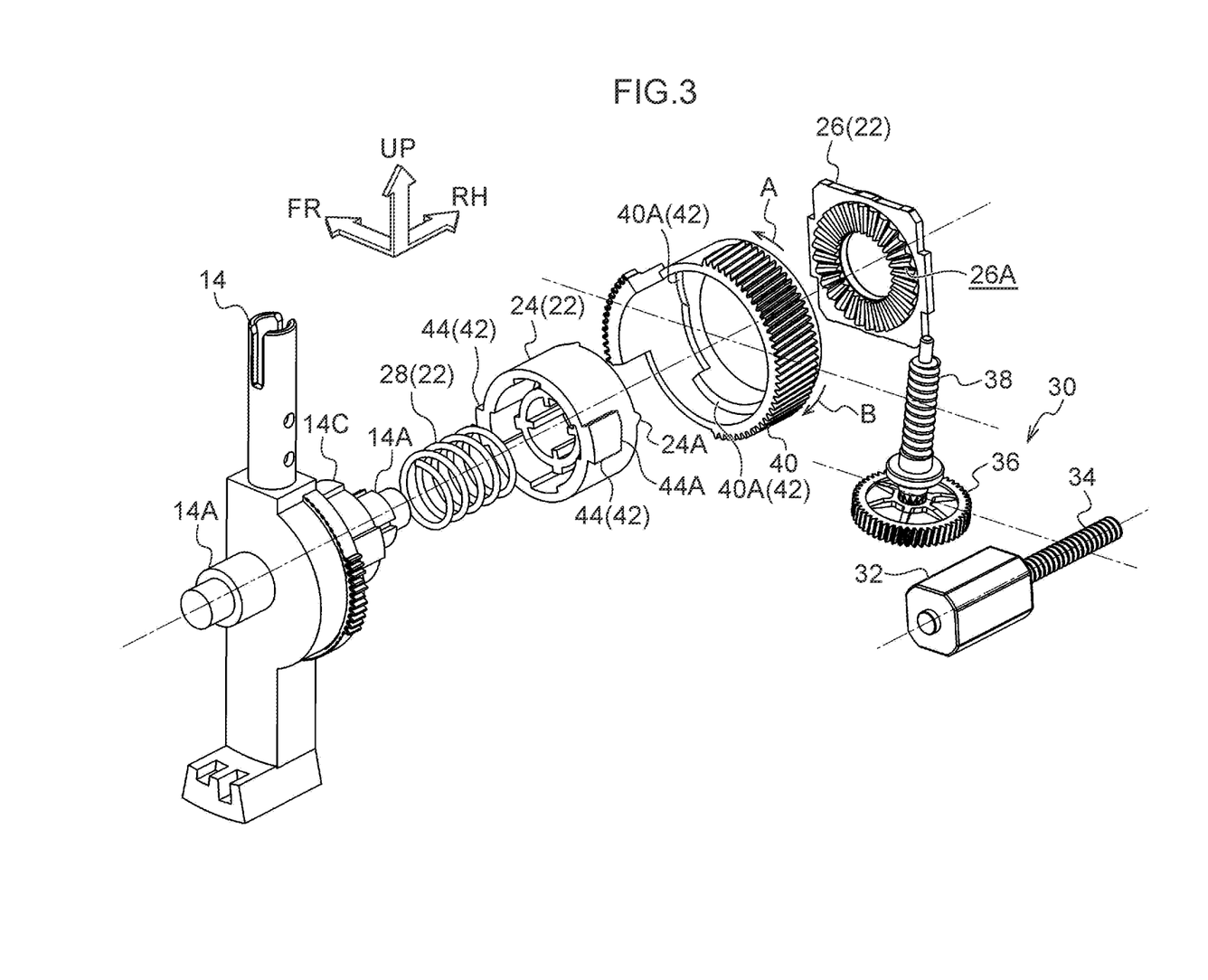
FIG. 3 is an exploded perspective view as seen from the left-side diagonally rearward direction showing the shift device according to the first exemplary embodiment of the present disclosure.

A shift device 10 according to a first exemplary embodiment of the present disclosure is shown in FIG. 1 in a perspective view as seen from a right-side diagonally rearward direction. In FIG. 3, this shift device 10 is shown in an exploded perspective view as seen from the left-side diagonally rearward direction. Note that, in the drawings, an arrow FR, an arrow RH, and an arrow UP respectively indicate a front side of the shift device 10, a right side of the shift device 10, and an upper side of the shift device 10.

The shift device 10 according to the present exemplary embodiment is installed in a console of a vehicle. The front side, right side, and upper side of the shift device 10 face respectively towards the front side, right side, and upper side of the vehicle.

As is shown in FIG. 1, a substantially rectangular parallelepiped-box shaped plate 12 (In FIG. 1 only a left wall of the plate 12 is shown) is provided in the shift device 10. The plate 12 is fixed to the inside of the console, and an interior of the plate 12 is open on the upper side thereof.

As is shown in FIG. 1 and FIG. 3, a rod-shaped lever 14, which serves as a shift body, is provided within the plate 12. Substantially circular-column shaped supporting shafts 14A are formed integrally with a central portion in an up-down direction of the lever 14 on a left side and a right side thereof. The left-side and right-side supporting shafts 14A protrude respectively towards the left and the right, and are mutually disposed on the same axis as each other. The left-side and right-side supporting shafts 14A are both supported so as to be able to rotate in the left wall and the right wall respectively of the plate 12. As a result, the lever 14 is able to move rotationally (i.e., to move back and forth) in the front-rear direction taking the pair of supporting shafts 14A as a central axis.

Figure 2:
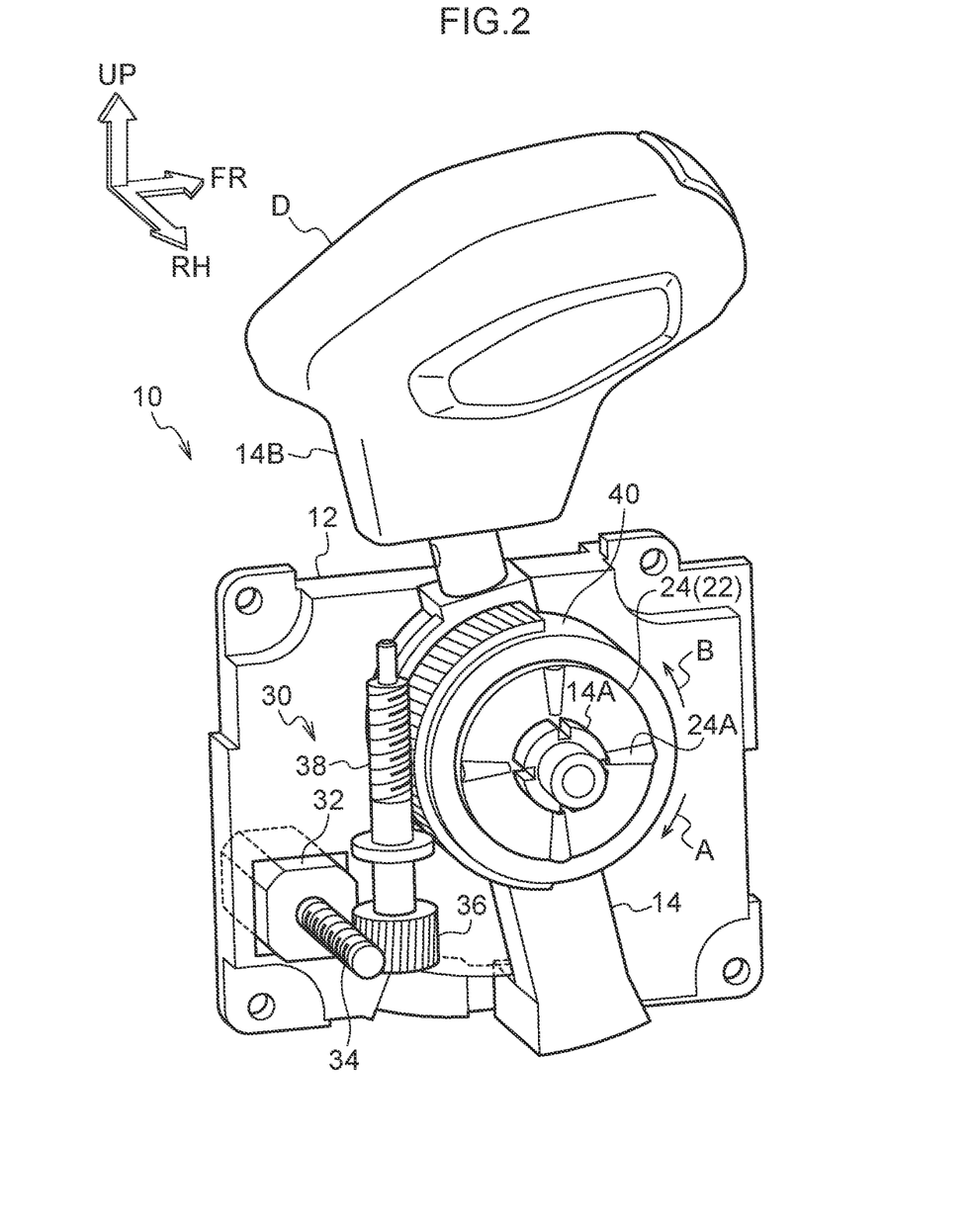
FIG. 2 is a perspective view as seen from the right-side diagonally rearward direction showing a state when a lever of the shift device according to the first exemplary embodiment of the present disclosure has been placed in a 'D' position.

An upper-side portion of the lever 14 protrudes above the plate 12 so as to be able to move rotationally, and protrudes above the console (i.e., into the vehicle cabin) so as to be able to move rotationally. A block-shaped knob 14B, which serves as a gripping portion, is provided integrally with an upper end portion of the lever 14. When the knob 14B is in a state of being gripped by an occupant of the vehicle (in particular, by the driver), the lever 14 is able be operated by being moved rotationally. As a result of the lever 14 (i.e., the knob 14B) being moved rotationally from the front side to the rear side, a shift position of the lever 14 is altered in the following sequence: 'P' position (parking position, predetermined position), 'R' position (reverse position), 'N' position (neutral position), and 'D' position (drive position; see FIG. 2). The lever 14 is able to move rotationally in a range from the 'P' position to the 'D' position, and the angle of rotational movement of the lever 14 is the same between each shift position.

A substantially circular-cylinder shaped rotation shaft 14C is formed integrally with the central portion in the up-down direction of the lever 14 on the right side thereof. The right-side supporting shaft 14A is integral with the rotation shaft 14C, and protrudes from the rotation shaft 14C so as to be coaxial therewith. When the lever 14 is moved rotationally towards the front side, the rotation shaft 14C is rotated in a positive direction A (see FIG. 1), while when the lever 14 is moved rotationally towards the rear side, the rotation shaft 14C is rotated in an opposite direction B (see FIG. 1).

A detection device 16 is connected to the lever 14. The detection device 16 detects a rotational movement position of the lever 14, and detects the shift position of the lever 14. The detection device 16 is electrically connected to a vehicle control device 18, and an automatic transmission 20 for a vehicle (i.e., a vehicle transmission) is also electrically connected to the control device 18.

A detent mechanism 22, which serves as an urging mechanism, is provided on the right-side of the lever 14.

An urging cylinder 24, which is shaped substantially as a circular cylinder having one closed end and which serves as an urging body, is provided in the detent mechanism 22. An interior of the urging cylinder 24 is open on the left side thereof. The rotation shaft 14C of the lever 14 is fitted inside the urging cylinder 24 so as to be coaxial therewith, and the right-side supporting shaft 14A of the lever 14 is inserted through, and fitted together with, a right wall (i.e., a top wall) of the urging cylinder 24 so as to be coaxial therewith. Consequently, the urging cylinder 24 is able to rotate integrally with the rotation shaft 14C and the right-side supporting shaft 14A, and is able to move (i.e., to slide) in the left-right direction (i.e., in the axial direction).

A plurality of (four in the present exemplary embodiment) substantially triangular-column shaped urging protruding portions 24A, which serve as urged portions, are formed integrally with a right surface (i.e. a top surface) of the urging cylinder 24, and these urging protruding portions 24A protrude onto the right side. The urging protruding portions 24A extend in a radial direction of the urging cylinder 24, and the plurality of urging protruding portions 24A are placed at equal intervals from each other in a circumferential direction of the urging cylinder 24.

A substantially rectangular-plate shaped detent plate 26, which serves as a holding body, is provided on the right side of the urging cylinder 24. The detent plate 26 is fixed to the inside of the plate 12 (for example, to the right wall of the plate 12). A plurality of urging recessed portions 26A, which have a substantially triangular cross-section and serve as urging portions, are formed on a left surface of the detent plate 26. The urging recessed portions 26 extend in a radial direction of the detent plate 26 (i.e., in a rotation radial direction of the lever 14). The plurality of urging recessed portions 26A are placed at equal intervals from each other in the circumferential direction of the detent plate 26, and the placement interval angle of each urging recessed portion 26A is the same as the angle of rotational movement between each shift position of the lever 14.

A detent spring 28 (i.e., a compression coil spring), which serves as an urging component, is provided inside the urging cylinder 24. The detent spring 28 is suspended between a right surface of the rotation shaft 14C of the lever 14 and the right wall of the urging cylinder 24, and the detent spring 28 urges the urging cylinder 24 towards the right side.

When the lever 14 is being placed in the respective shift positions, the urging protruding portions 24A of the urging cylinder 24 are inserted by urging force from the detent spring 28 into the urging recessed portions 26A of the detent plate 26, so that the urging protruding portions 24A are engaged with the urging recessed portions 26A in the circumferential direction of the urging plate 26. As a result, the rotation position of the urging cylinder 24 is held, and the lever 14 is held in the respective shift positions. When the lever 14 is being operated by being moved rotationally in order to alter the shift position of the lever 14, the urging cylinder 24 is moved to the left side in resistance to the urging force from the detent spring 28, while the urging projection portions 24A are separated from the urging recessed portions 26A. Subsequently, the urging cylinder 24 is moved to the right side by the urging force from the detent spring 28, and each urging protruding portion 24A is inserted respectively into the urging recessed portion 26A adjacent to the urging recessed portion 26A with which it was previously engaged. As a result, after rotational movement resistance force has acted in the rotational movement operation of the lever 14, rotational movement assistance force is applied, so that a sense of moderation is applied in the rotational movement operation of the lever 14.

A drive mechanism 30, which serves as a movement mechanism, is provided on the right side of the lever 14.

A motor 32, which serves as a drive device, is provided in the drive mechanism 30. The motor 32 is fixed to the left wall of the plate 12, and is electrically connected to the control device 18. A worm 34 is fixed to an output shaft of the motor 32 so as to be coaxial therewith, and when the motor 32 is driven via the control of the control device 18, the worm 34 is rotated.

A helical gear 36 (i.e., a worm wheel) meshes with the worm 34, and the helical gear 36 is supported inside the plate 12 so as to be able to rotate. A worm gear 38 (i.e., a worm) is fixed to an upper side of the helical gear 36 so as to be coaxial therewith, and when the worm 34 is rotated, both the helical gear 36 and the worm gear 38 are rotated integrally therewith.

An outer circumference (i.e., a worm wheel) of a substantially circular-cylinder shaped rotor cam 40 meshes with the worm gear 38, and the urging cylinder 24 of the detent mechanism 22 is engaged with the inside of the rotor cam 40 so as to be coaxial therewith. The rotor cam 40 is supported in the urging cylinder 24 so as to be able to rotate, however, movement of the cam 40 in the left-right directions (i.e., in the axial direction) thereof is restricted. The rotor cam 40 is placed in a reference rotation position (i.e., a reference position), and when the worm gear 38 is rotated, the rotor cam 40 also rotates.

Figure 4:
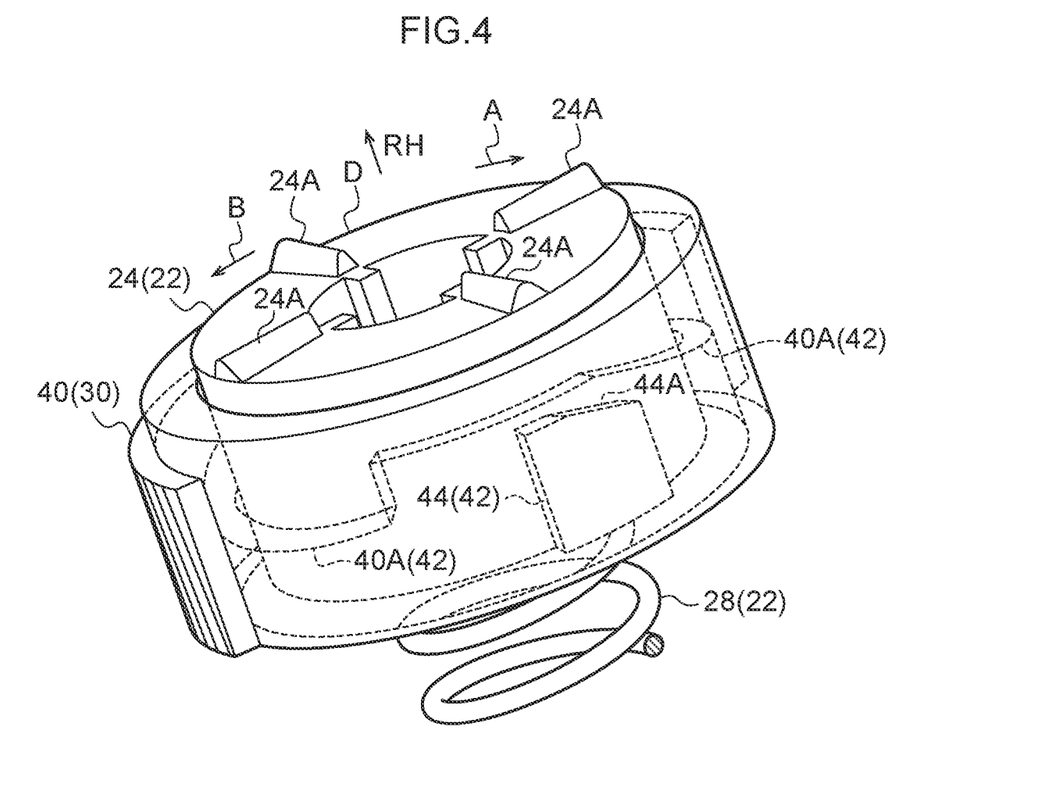
FIG. 4 is a perspective view showing a rotor cam and the like of the shift device according to the first exemplary embodiment of the present disclosure.

A release mechanism 42 (see FIG. 4) is provided between the urging cylinder 24 and the rotor cam 40.

A plurality of (two in the present exemplary embodiment) transmitting surfaces 40A, which serve as transmitting portions, are formed in an inner circumferential-side portion of a circumferential wall of the rotor cam 40. The plurality of transmitting surfaces 40A are placed at equal intervals from each other in the circumferential direction of the rotor cam 40. The transmitting surfaces 40A face towards the left side, and are inclined so as to slope in a direction towards the right side as they approach the positive direction A.

A plurality of (two in the present exemplary embodiment) of substantially rectangular rotation plates 44 are formed integrally with the outer circumferential surface of the urging cylinder 24. The plurality of rotation plates 44 are placed at equal intervals from each other in the circumferential direction of the urging cylinder 24. The rotation plates 44 protrude towards the outer side in the radial direction of the urging cylinder 24, and are disposed on the left side of the transmitting surfaces 40A of the rotor cam 40. A rotation surface 44A, which serves as a movement portion, is formed in an angle portion between the opposite direction B side and the right side of each rotation plate 44, and these rotation surfaces 44A face towards the right side. The rotation surfaces 44A are inclined so as to slope in a direction towards the right side as they approach the positive direction A, and an angle of inclination of the rotation surfaces 44A is the same as an angle of inclination of the transmitting surfaces 40A. When the lever 14 is being operated so as to move rotationally within a range from the 'P' position to the 'D' position, the rotation surfaces 44A are apart towards the positive direction A side from the transmitting surfaces 40A.

Next, actions of the present exemplary embodiment will be described.

In the shift device 10 having the above-described structure, when the lever 14 is placed in the respective shift positions, in the detent mechanism 22, the urging protruding portions 24A of the urging cylinder 24 are inserted into the urging recessed portions 26A of the detent plate 26 by the urging force of the detent spring 28, so that the lever 14 is held in the respective shift positions (i.e., is urged towards the respective shift position side).

When the lever 14 is operated by being moved rotationally so that the shift position of the lever 14 is altered (i.e., when the alteration of the shift position of the lever 14 is detected by the detection device 16), the shift range of the automatic transmission 20 is altered via control performed by the control device 18 to a shift range that corresponds to the shift position of the lever 14.

Figure 5A:
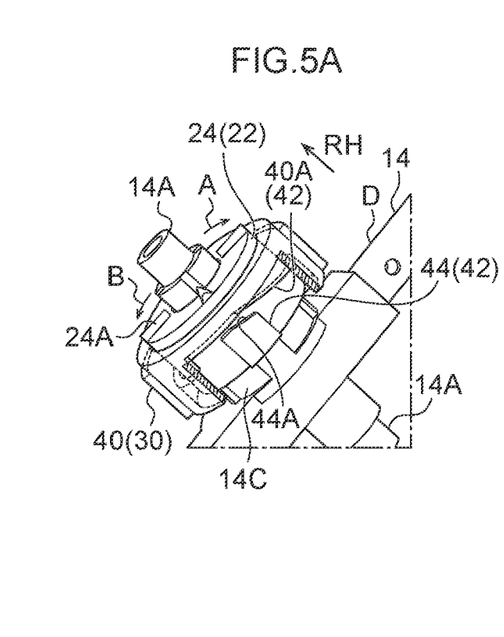
FIG. 5A is a perspective view as seen from a front side showing a state when the lever of the shift device according to the first exemplary embodiment of the present disclosure has been placed in the 'D' position.

If predetermined circumstances (for example, if the engine of the vehicle is turned off) occur when the lever 14 is placed in a position other than the 'P' position (for example, in the 'D' position; see FIG. 5A) (i.e., when the detection device 16 has detected that the lever 14 has been placed in a position other than the 'P' position), then the shift range of the automatic transmission 20 is automatically altered via control performed by the control device 18 to the 'P' range (i.e. to the parking range).

Figure 5B:
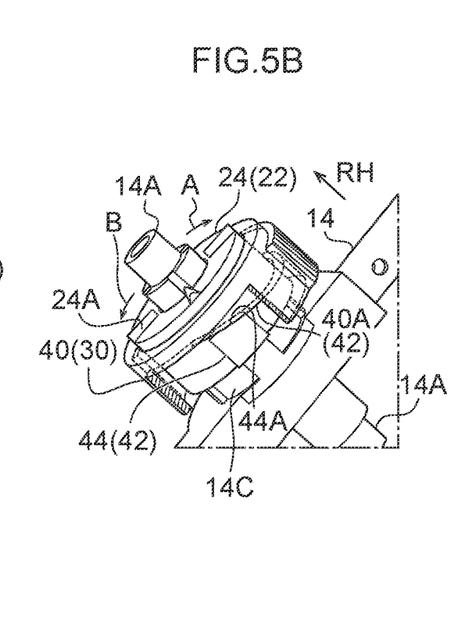
FIG. 5B is a perspective view as seen from the front side showing a state when the rotor cam of the shift device according to the first exemplary embodiment of the present disclosure is transmitting rotation force.

If these predetermined circumstances occur while the lever 14 is placed in a position other than the 'P' position, then in the drive mechanism 30, the motor 32 is positively driven via control performed by the control device 18 so that the worm 34, the helical gear 36, and the worm gear 38 are rotated. This causes the rotor cam 40 to be rotated from the reference rotation position in the positive direction A. Because of this, in the release mechanism 42, the transmitting surfaces 40A of the rotor cam 40 press the rotation surfaces 44A of the urging cylinder 24 towards the left side (see FIG. 5B), and the urging cylinder 24 is moved to the left while resisting the urging force of the detent spring 28. As a result, the urging protruding portions 24A are separated from the urging recessed portions 26A, and the hold on the shift position of the lever 14 is released. The rotor cam 40 is then rotated further in the positive direction A, and in a state in which each transmitting surface 40A and rotation surface 44A forms a single integral body, the urging cylinder 24 is rotated in the positive direction A integrally with the rotor cam 40. As a result, the lever 14 is moved rotationally towards the front side to the 'P' position, and the shift position of the lever 14 is made to correspond to the shift range of the automatic transmission 20.

Moreover, when the shift lever 14 has been moved rotationally to the 'P' position (i.e., when the detection device 16 has detected that the lever 14 has been moved rotationally to the 'P' position), the motor 32 is driven in reverse via control performed by the control device 18. As a result, the worm 34, the helical gear 36, and the worm gear 38 are rotated, and the rotor cam 40 is rotated in the opposite direction B. Because of this, the transmitting surfaces 40A of the rotor cam 40 are moved in the opposite direction B away from the rotation surfaces 44A of the urging cylinder 24, and the urging cylinder 24 is moved towards the right by the urging force of the detent spring 28. As a result, the urging protruding portions 24A are inserted into the urging recessed portions 26A, and the lever 14 is held in the 'P' position. The rotor cam 40 is then rotated further in the opposite direction B, and is returned to the reference rotation position.

Figure 5C:
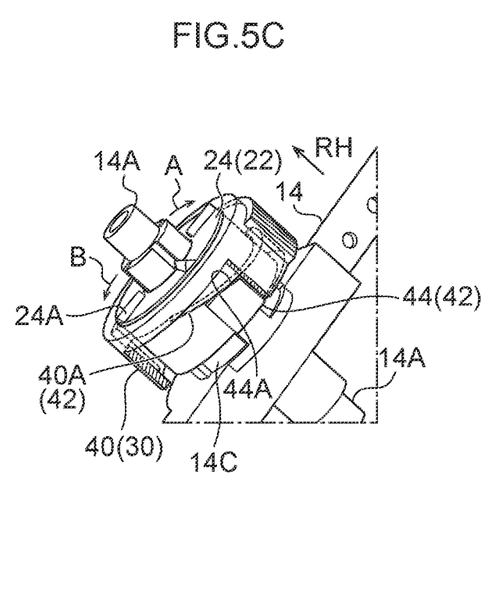
FIG. 5C is a perspective view as seen from the front side showing a state when a load is applied to the lever while the rotor cam of the shift device according to the first exemplary embodiment of the present disclosure is in a state of transmitting rotation force.

Here, when the lever 14 is moved rotationally towards the front side (i.e., towards the 'P' position side) by the drive mechanism 30, in a case in which a load (i.e., movement restricting force) towards the rear side acts on the lever 14 so that rotational movement of the lever 14 towards the front side is restricted (including cases in which the lever 14 is moved rotationally towards the rear side (see FIG. 5C)), in the release mechanism 42, the rotation surfaces 44A of the urging cylinder 24 are rotated in the opposite direction B relative to the transmitting surfaces 40A of the rotor cam 40, and the urging cylinder 24 is moved towards the left while resisting the urging force of the detent spring 28. As a result, rotation force of the urging cylinder 24 in the opposite direction B relative to the rotor cam 40 is released. Because of this, the load towards the rear side that is acting on the lever 14 can be released, and it is possible to inhibit damage to any parts on the rotation force (i.e., rotational movement force) transmission path from the drive mechanism 30 to the lever 14.

Furthermore, when the lever 14 is being moved rotationally towards the front side by the drive mechanism 30, after the rotational movement of the lever 14 towards the front side has been restricted (i.e., after the detection device 16 has detected that the rotational movement of the lever 14 towards the front side has been restricted, namely, after the rotation force of the urging cylinder 24 in the opposite direction B relative to the rotor cam 40 has been released), the motor 32 is driven in reverse via control performed by the control device 18, and the rotor cam 40 is rotated in the opposite direction B. As a result, the transmitting surfaces 40A of the rotor cam 40 are moved in the opposite direction B away from the rotation surfaces 44A of the urging cylinder 24, and the rotor cam 40 is returned to the reference rotation position. For this reason, it is possible to inhibit the rotational movement of the lever 14 towards the rear side from being restricted due to the rotation surfaces 44A abutting against the transmitting surfaces 40A. Moreover, as a result of the urging cylinder 24 being moved to the right by the urging force of the detent spring 28, and the urging protruding portions 24A of the urging cylinder 24 being inserted into the urging recessed portions of the detent plate 26, the lever 14 can be held in the shift position.

Moreover, when the lever 14 is moved rotationally towards the front side by the drive mechanism 30, in the detent mechanism 22, the urging protruding portions 24A of the urging cylinder 24 are separated from the urging recessed portions of the detent plate 26, and the hold on the lever 14 in the shift position is released. Because of this, the urging protruding portions 24A can be prevented (i.e., restricted) from interfering with the urging recessed portions 26A, and it is possible to inhibit the detent mechanism 22 from obstructing the lever 14 when this is being moved rotationally towards the front side by the drive mechanism 30.

Furthermore, when the lever 14 is being moved rotationally towards the front side by the drive mechanism 30, in the release mechanism 42, the rotor cam 40 (i.e., the transmitting surface 40A) causes the urging cylinder 24 (i.e., the rotating surface 44A) to move towards the left in resistance to the urging force of the detent spring 28, and the hold on the lever 14 in the shift position is released. Because of this, it is no longer necessary for a separate mechanism for releasing the hold on the lever 14 in the shift position to be provided in addition to the release mechanism 42, so that the structure of the shift device 10 can be simplified.

Second Exemplary Embodiment

Figure 6A:
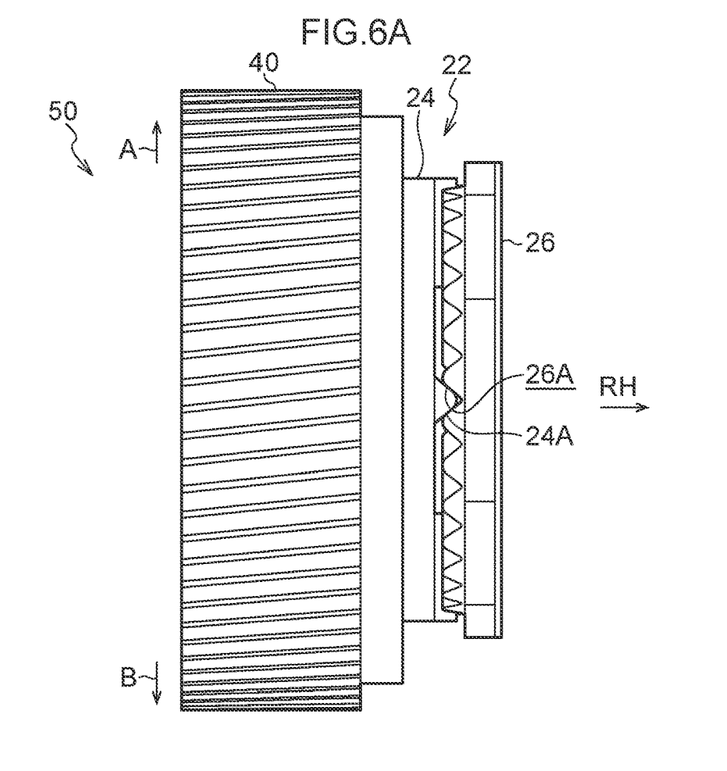
FIG. 6A is a side view showing a rotor cam and the like of a shift device according to a second exemplary embodiment of the present disclosure.
Figure 6B:
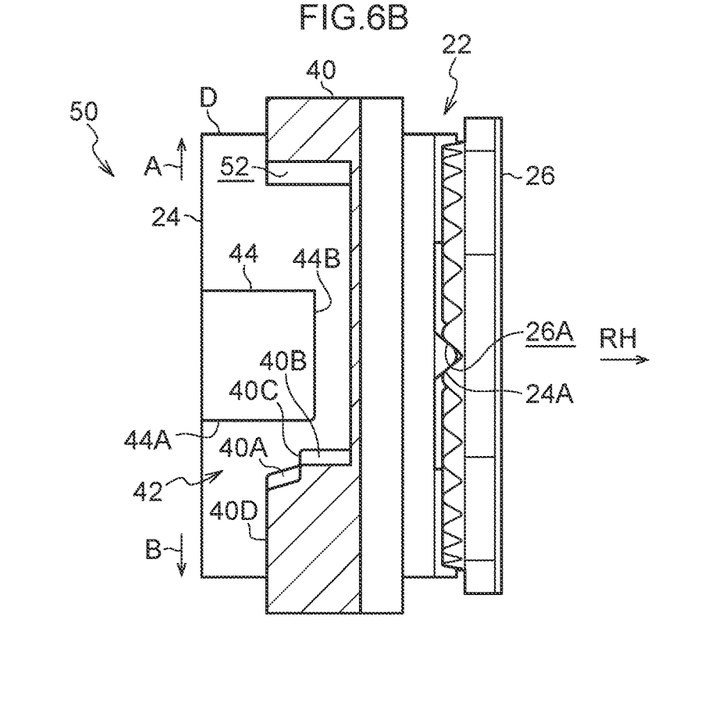
FIG. 6B is a broken side view showing the rotor cam and the like of the shift device according to the second exemplary embodiment of the present disclosure.

The rotor cam 40 and the like of a shift device 50 according to a second exemplary embodiment of the present disclosure is shown in a side view in FIG. 6A, while the rotor cam 40 and the like of the shift device 50 is shown in a broken side view in FIG. 6B.

The shift device 50 according to the present exemplary embodiment has substantially the same structure as that of the first exemplary embodiment but differs, however, in the following points.

As is shown in FIG. 6A and FIG. 6B, in the release mechanism 42 of the shift device 50 of the present exemplary embodiment, a plurality of (two in the present exemplary embodiment) placement holes 52 having a substantially rectangular cross-section are formed in an inner circumferential-side portion of the circumferential wall of the rotor cam 40, and the plurality of placement holes 52 are placed at equal intervals from each other in the circumferential direction of the rotor cam 40. The placement holes 52 are open towards the left side, and a left-side portion of the placement holes 52 are enlarged in the opposite direction B. A right-side portion of the opposite direction B-side surface of each placement hole 52 forms the pressing surface 40B which serves as a pressing portion. The pressing surfaces 40B are disposed so as to be perpendicular to the circumferential direction of the rotor cam 40. A left-side portion of the opposite direction B-side surface of each placement hole 52 forms the transmitting surface 40A. Each transmitting surface 40A is inclined so as to slope in a direction towards the right side as they approach the positive direction A. The surface on the opposite direction B side of each placement hole 52 forms a restricting surface 40C, which serves as a restricting portion, between the pressing surface 40B and the transmitting surface 40A. The restricting surfaces 40C face towards the left, and are disposed so as to be perpendicular to the left-right direction (i.e., to the axial direction of the rotor cam 40).

Portions other than the placement holes 52 of the left surface of the inner circumferential-side portion of the circumferential wall of the rotor cam 40 form separation surfaces 40D which serve as separation portions. The separation surfaces 40D face towards the left, and are disposed so as to be perpendicular to the left-right direction.

The surface on the opposite direction B side of each rotation plate 44 of the urging cylinder 24 forms the rotation surface 44A, and the rotation surfaces 44A are disposed so as to be perpendicular to the circumferential direction of the urging cylinder 24. A right surface of each rotation surface 44A forms an abutting surface 44B which serves as a restricted component. The abutting surfaces 44B face towards the right, and are disposed so as to be perpendicular to the left-right direction (i.e., to the axial direction of the urging cylinder 24). The rotation plates 44 are inserted into the placement holes 52 of the rotor cam 40 from the left side, and the abutting surface 44B is disposed on the right side of the restricting surface 40C in each placement hole 52. When the lever 14 is being operated within a range from the 'P' position to the 'D' position, the rotation plates 44 are apart in the circumferential direction of the urging cylinder 24 from the positive direction A-side surface of the placement hole 52 and from the pressing surface 40B.

Note that, if the predetermined circumstances occur when the lever 14 is placed in a position other than the 'P' position (for example, in the 'D' position; see FIG. 6B), in the drive mechanism 30, the motor 32 is driven positively via control performed by the control device 18, then the worm 34, the helical gear 36, and the worm gear 38 are rotated, and the rotor cam 40 is rotated in the positive direction A from the rotation reference position.

Figure 7A:
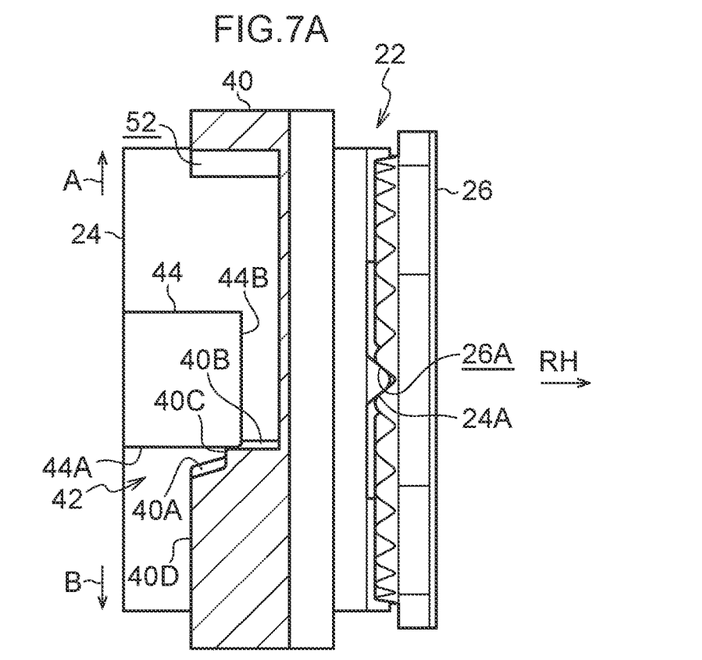
FIG. 7A is a broken side view showing a first stage of a transmission of rotation force by the rotor cam of the shift device according to the second exemplary embodiment of the present disclosure.
Figure 7B:
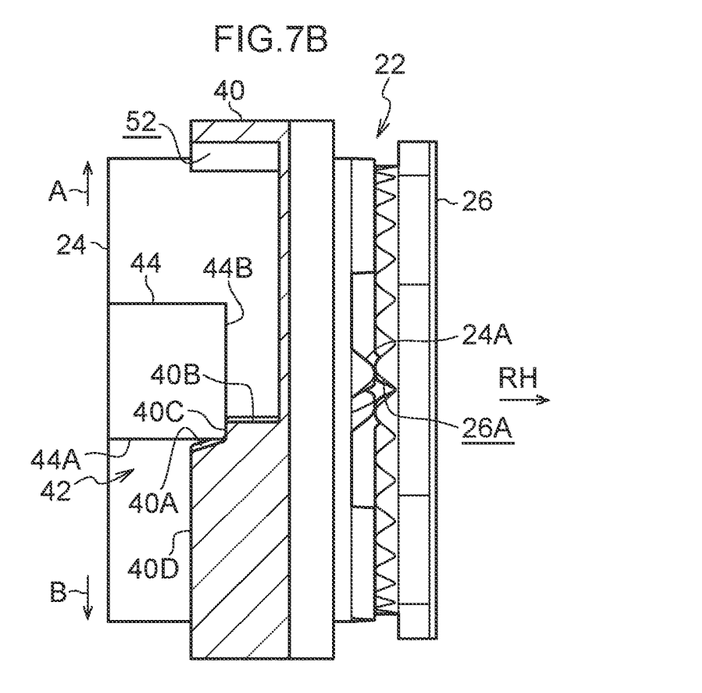
FIG. 7B is a broken side view showing a second stage of the transmission of rotation force by the rotor cam of the shift device according to the second exemplary embodiment of the present disclosure.

Because of this, in the release mechanism 42, as a result of the pressing surfaces 40B of the rotor cam 40 (i.e., the placement holes 52) pressing the rotation surfaces 44A of the urging cylinder 24 (i.e., the rotation plates 44) and thereby causing the urging cylinder 24 to rotate in the positive direction A (see FIG. 7A), in the detent mechanism 22, the urging protruding portion 24A-side surface of the urging cylinder 24 slide across the urging recessed portion 26A-side surface of the detent plate 26, and the urging cylinder 24 is moved to the left while resisting the urging force of the detent spring 28 (see FIG. 7B). Furthermore, as a result of the rotation surfaces 44A moving to the left side away from the pressing surfaces 40B, so that the abutting surfaces 44B of the urging cylinder 24 (i.e., the rotation plates 44A) are made to abut against the restricting surfaces 40C of the rotor cam 40 (i.e., the placement holes 52) by the urging force of the detent spring 28, movement of the urging cylinder 24 to the right is restricted, and the amount by which the urging protruding portions 24A are inserted into the urging recessed portions 26A is made smaller.

Next, when the rotor cam 40 is rotated further in the positive direction A so that the transmitting surfaces 40A of the rotor cam 40 (i.e., the placement holes 52) press the rotation surfaces 44A of the urging cylinder 24, the urging cylinder 24 is rotated in the positive direction A while being intermittently moved slightly to the left, while resisting the urging force of the detent spring 28, by the abutting of the urging protruding portions 24A against portions (i.e., protruding portions) between the urging recessed portions 26A. As a result, the lever 14 is moved rotationally towards the front side to the 'P' position, and the shift position of the lever 14 is made to correspond to the shift range of the automatic transmission 20.

Moreover, when the shift lever 14 has been moved rotationally to the 'P' position, the motor 32 is driven in reverse via control performed by the control device 18. As a result, the worm 34, the helical gear 36, and the worm gear 38 are rotated, and the rotor cam 40 is rotated in the opposite direction B. Because of this, the restricting surfaces 40C of the rotor cam 40 are moved in the opposite direction B away from the abutting surfaces 44B of the urging cylinder 24, and the urging cylinder 24 is moved towards the right by the urging force of the detent spring 28. As a result, the urging protruding portions 24A are inserted into the urging recessed portions 26A, and the lever 14 is held in the 'P' position. The rotor cam 40 is then rotated further in the opposite direction B, and is returned to the reference rotation position.

Figure 8A:
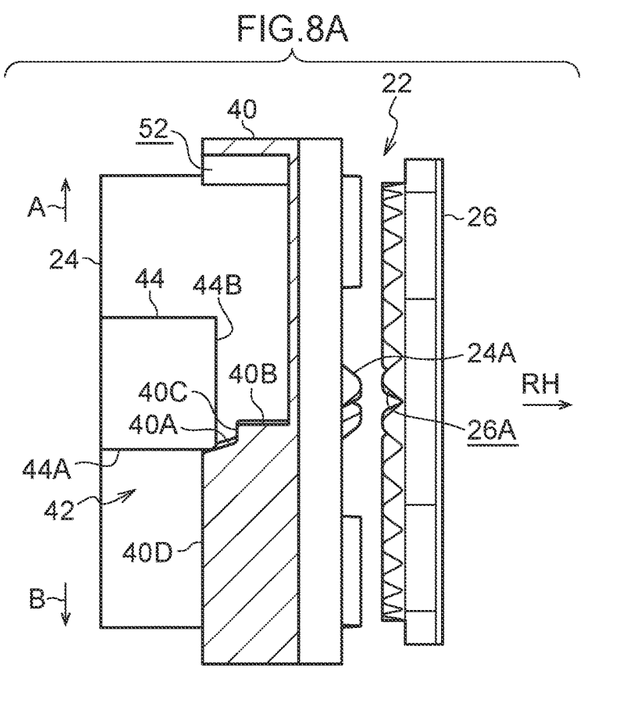
FIG. 8A is a broken side view showing a first stage when a load is applied to a lever while the rotor cam of the shift device according to a second exemplary embodiment of the present disclosure is in a state of transmitting rotation force.
Figure 8B:
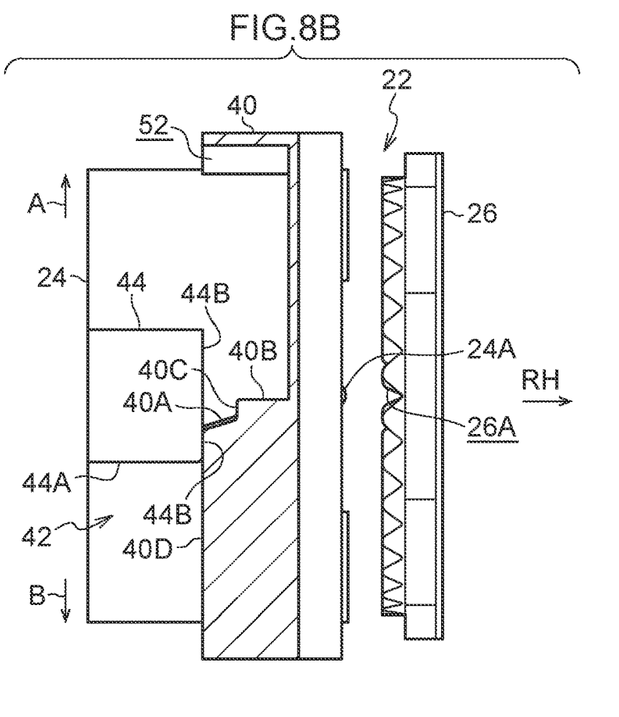
FIG. 8B is a broken side view showing a second stage when the load is applied to the lever while the rotor cam of the shift device according to the second exemplary embodiment of the present disclosure is in a state of transmitting rotation force.

Here, when the lever 14 is moved rotationally towards the front side (i.e., towards the 'P' position side) by the drive mechanism 30, in a case in which a load (i.e., movement restricting force) towards the rear side acts on the lever 14, so that rotational movement of the lever 14 towards the front side is restricted (including cases in which the lever 14 is moved rotationally towards the rear side), in the release mechanism 42, the rotation surfaces 44A of the urging cylinder 24 are rotated in the opposite direction B relative to the transmitting surfaces 40A of the rotor cam 40, and the urging cylinder 24 is moved towards the left while resisting the urging force of the detent spring 28 (see FIG. 8A). As a result, the rotation surfaces 44A are moved to the left side away from the transmitting surfaces 40A, and the abutting surfaces 44B of the urging cylinder 24 are made to abut against the separation surfaces 40D of the rotor cam 40 by the urging force of the detent spring 28 (see FIG. 8B). Because of this, the relative rotation of the urging cylinder 24 in the opposite direction B relative to the rotor cam 40 is permitted, and the rotation force of the urging cylinder 24 in the opposite direction B relative to the rotor cam 40 is released.

Furthermore, when the lever 14 is being moved rotationally towards the front side by the drive mechanism 30, after the rotational movement of the lever 14 towards the front side has been restricted (i.e., after the detection device 16 has detected that the rotational movement of the lever 14 towards the front side has been restricted, namely, after the rotation force of the urging cylinder 24 in the opposite direction B relative to the rotor cam 40 has been released), the motor 32 is driven in reverse via control performed by the control device 18, and the rotor cam 40 is rotated in the opposite direction B. As a result, the separation surfaces 40D of the rotor cam 40 is moved in the opposite direction B away from the abutting surfaces 44B of the urging cylinder 24, and the restricting surfaces 40C of the rotor cam 40 are moved in the opposite direction B way from the abutting surfaces 44B of the urging cylinder 24, so that the rotor cam 40 is returned to the reference rotation position.

As a result of the above, in the present exemplary embodiment as well, the same actions and effects can be obtained as from the above-described first exemplary embodiment.

In particular, when the lever 14 is being moved rotationally towards the front side by the drive mechanism 30, in the detent mechanism 22, the amount by which the urging protruding portions 24A of the urging cylinder 24 are inserted into the urging recessed portions 26A in the detent plate 26 is made smaller, and the hold on the lever 14 in the shift position is released. Because of this, the urging protruding portions 24A can be inhibited (i.e., restricted) from interfering with the urging recessed portions 26A, and it is possible to inhibit the detent mechanism 22 from obstructing the lever 14 when this is being moved rotationally towards the front side by the drive mechanism 30.

Furthermore, when the lever 14 is being moved rotationally towards the front side by the drive mechanism 30, in the release mechanism 42, the rotor cam 40 (i.e., the pressing surfaces 40B) presses the urging cylinder 24 (i.e., the rotation surfaces 44A) in the positive direction A. As a result, the urging cylinder 24 is moved towards the left in resistance to the urging force of the detent spring 28, and the hold on the lever 14 in the shift position is released. Because of this, it is no longer necessary for a separate mechanism for releasing the hold on the lever 14 in the shift position in addition to the release mechanism 42 to be provided, so that the structure of the shift device 10 can be simplified.

Note that, in the above described first exemplary embodiment and second exemplary embodiment, in the detent mechanism 22, the urging protruding portions 24A are provided in the urging cylinder 24, and the urging recessed portions 26A are provided in the detent plate 26. However, in the detent mechanism 22, it is also possible for the urging recessed portions 26A to be provided in the urging cylinder 24, and for the urging protruding portions 24A to be provided in the detent plate 26.

Furthermore, in the above described first exemplary embodiment and second exemplary embodiment, when the lever 14 is being moved rotationally towards the front side by the drive mechanism 30, in the release mechanism 42, as a result of the rotor cam 40 (i.e., the transmitting surfaces 40A or the pressing surfaces 40B) pressing the urging cylinder 24 (i.e., the rotation surfaces 44A) in the positive direction A, the urging cylinder 24 is moved to the left in resistance to the urging force of the detent spring 28, so that the hold on the lever 14 in the shift position is released. However, when the lever 14 is being moved rotationally towards the front side by the drive mechanism 30, it is also possible for a separate mechanism from the release mechanism 42 to move the urging cylinder 24 to the left in resistance to the urging force of the detent spring 28, and to thereby release the hold on the lever 14 in the shift position.

Moreover, in the above described first exemplary embodiment and second exemplary embodiment, the lever 14 (i.e., the shift body) is moved rotationally. However, it is also possible for the shift body to be made to slide or to be rotated around its central axis.

Furthermore, in the above described first exemplary embodiment and second exemplary embodiment, the shift devices 10 and 50 are installed in a console. However, it is also possible for the shift devices 10 and 50 to be installed another portion of the vehicle (such as the instrument panel or the steering column or the like).

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A shift device comprising:
   a shift body in which a shift position is altered as a result of the shift body being moved;
   a movement mechanism that transmits motive force to the shift body so that the shift body is automatically moved; and
   a release mechanism that is provided on a motive force transmission path from the movement mechanism to the shift body, and that, in a case in which movement of the shift body to which motive force is to be transmitted by the movement mechanism is restricted, releases a movement restricting force applied to the shift body.

2. The shift device according to claim 1, further comprising an urging mechanism that urges the shift body towards a shift position side, and urging of the shift body by the urging mechanism is restricted in a case in which the movement mechanism transmits motive force to the shift body.

3. The shift device according to claim 2, wherein the release mechanism restricts urging of the shift body by the urging mechanism in a case in which the movement mechanism transmits motive force to the shift body.

4. The shift device according to claim 2, wherein, in a case in which the movement mechanism transmits motive force to the shift body, the urging mechanism is maintained in a state in which urging of the shift body by the urging mechanism is restricted.

5. The shift device according to claim 2, wherein, after the movement mechanism has ended transmission of motive force to the shift body, the urging mechanism urges the shift body towards the shift position side.

6. The shift device according to claim 1, wherein, after movement of the shift body to which the movement mechanism is transmitting motive force has been restricted, the movement mechanism is restored to a state the movement mechanism was in prior to transmitting motive force to the shift body.

7. The shift device according to claim 1, wherein the release mechanism releases the movement restricting force being applied to the shift body while resisting urging force.

8. The shift device according to claim 7, further comprising an urging mechanism that urges the shift body towards a shift position side, and the release mechanism releasing the movement restricting force being applied to the shift body while resisting the urging force of the urging mechanism.

9. The shift device according to claim 1, wherein the release mechanism releases the movement restricting force applied to the shift body when the movement restricting force reaches a predetermined threshold.

10. The shift device according to claim 1, wherein the movement mechanism includes a drive train, and the release mechanism forms part of the drive train of the movement mechanism.

* * * * *